US007911509B2

(12) United States Patent
Jendbro

(10) Patent No.: US 7,911,509 B2
(45) Date of Patent: Mar. 22, 2011

(54) ADAPTIVE VIDEO ENCODE SCALING

(75) Inventor: Magnus Jendbro, Staffanstorp (SE)

(73) Assignee: Sony Ericsson Mobile Communications AB, Lund (SE)

( * ) Notice: Subject to any disclaimer, the term of this patent is extended or adjusted under 35 U.S.C. 154(b) by 561 days.

(21) Appl. No.: 12/046,656

(22) Filed: Mar. 12, 2008

(65) Prior Publication Data
US 2009/0232480 A1 Sep. 17, 2009

(51) Int. Cl.
H04N 5/76 (2006.01)
H04N 5/235 (2006.01)
H04N 5/50 (2006.01)
H04N 7/12 (2006.01)
H04M 1/00 (2006.01)

(52) U.S. Cl. ............ 348/231.6; 348/222.1; 348/231.1; 348/231.2; 348/568; 375/240.26; 455/575.1

(58) Field of Classification Search ............ 348/231.1, 348/231.2, 231.3, 222.1, 231.6, 14.12, 14.13, 348/568; 375/240.01, 240.25, 240.26; 455/575.1
See application file for complete search history.

(56) References Cited

U.S. PATENT DOCUMENTS

| 6,028,631 | A * | 2/2000 | Nakaya et al. ......... 375/240.01 |
| 6,122,411 | A * | 9/2000 | Shen et al. ............... 382/299 |
| 6,885,395 | B1 * | 4/2005 | Rabbani et al. ........... 348/231.1 |
| 2001/0050875 | A1 * | 12/2001 | Kahn et al. ................... 365/229 |
| 2002/0071662 | A1 * | 6/2002 | Tatsumi et al. ............. 386/100 |
| 2004/0075750 | A1 * | 4/2004 | Bateman .................. 348/231.1 |
| 2004/0141718 | A1 * | 7/2004 | Miyagoshi et al. ........... 386/46 |
| 2004/0158878 | A1 * | 8/2004 | Ratnakar et al. ............ 725/150 |
| 2006/0215755 | A1 * | 9/2006 | Ju ............................ 375/240.12 |
| 2008/0084491 | A1 * | 4/2008 | He et al. ................... 348/333.13 |

FOREIGN PATENT DOCUMENTS

| EP | 1 158 764 | 11/2001 |
| EP | 1 443 511 | 8/2004 |
| EP | 1 681 867 | 7/2006 |
| WO | WO 2004/047450 | 6/2004 |

OTHER PUBLICATIONS

Invitation to Pay Additional Fees and, Where Applicable, Protest Fee, corresponding to PCT/IB2008/053672 dated Jun. 12, 2009, 7 pages.
Notification of Transmittal of the International Search Report and the Written Opinion of the International Searching Authority, of the Declaration, corresponding to PCT/IB2008/053672, mailed Nov. 13, 2009.

* cited by examiner

Primary Examiner — Lin Ye
Assistant Examiner — Marly Camargo
(74) Attorney, Agent, or Firm — Harrity & Harrity, LLP

(57) ABSTRACT

A mobile video terminal includes a video camera to supply video signals; processing logic to selectively encode the video signals from the video camera at different quality levels; a memory to store the video signals encoded by the processing logic; and a power supply to supply power for the mobile video terminal, where the processing logic is further configured to automatically alter the encoding of the video signals from the video camera based on a condition of at least one of the memory, the power supply, or the processing logic.

18 Claims, 8 Drawing Sheets

ADAPTIVE VIDEO ENCODE SCALING

BACKGROUND

A variety of portable media devices are being developed to support high-definition (HD) video. Compared to most other display resolutions, encoding and decoding of HD video are both memory-intensive and power-intensive. For example, the bitrate for H.264 video at 1080p resolution may be up to 20 Mbps. Thus, a 10-minute video clip at the 1080p display resolution may consume up to 1.5 gigabytes of memory. Similarly, processing of HD video typically consumes power at a greater rate than processing of lower-resolution video. A user's preference for HD video in a portable media device may thus be limited by the memory capacity, battery life, and or processing capacity of the portable media device.

SUMMARY

According to one implementation, a mobile video terminal is provided. The mobile video terminal may include a video camera to supply video signals; processing logic to selectively encode the video signals from the video camera at different resolutions; a memory to store the video signals encoded by the processing logic; and memory sensing logic to monitor the memory and generate information regarding an available capacity of the memory, where the processing logic is further configured to automatically alter the resolution of the video signals based on the information regarding the available capacity of the memory from the memory sensing logic.

Additionally, the processing logic selectively compresses the video signals at different compressions and automatically alters the compression of the video signals based on the information regarding the available capacity of the memory from the memory sensing logic.

Additionally, the mobile video terminal may further include a power supply of finite capacity to supply power for the processing logic; and power supply sensing logic to monitor the power supply and generate information regarding an available capacity of the power supply, where the processing logic is further configured to automatically alter the resolution of the video signals based on the information regarding the available capacity of the power supply from the power supply sensing logic.

Additionally, the mobile video terminal may further include processing sensing logic to monitor the processing logic and generate information regarding an available processing demands on the processing logic, where the processing logic is further configured to automatically alter the resolution of the video signals based on the information regarding the available processing demands on the processing logic from the processing sensing logic.

Additionally, the mobile video terminal may further include a display to provide indications to a user, where the display indicates to the user that the resolution of the video signals will be automatically altered prior to automatically altering the resolution of the video signals.

Additionally, the mobile video terminal may further include an input device to permit the user to override the automatic altering of the resolution of the video signals by the processing logic.

Additionally, the processing logic may be configured to automatically reduce the resolution of the video signals from the video camera when the available memory capacity reaches a particular threshold.

According to another implementation, a mobile video terminal is provided. The mobile video terminal may include a video camera to supply video signals; processing logic to selectively encode the video signals from the video camera at different quality levels; a memory to store the video signals encoded by the processing logic; a power supply to supply power for the mobile video terminal, where the processing logic is further configured to automatically alter the encoding of the video signals from the video camera based on a condition of at least one of the memory, the power supply, or the processing logic.

Additionally, the condition may correspond to available capacity in the memory.

Additionally, the condition may correspond to available capacity of the processing logic.

Additionally, the condition may correspond to available capacity of the power supply.

Additionally, the processing logic may be further configured to further automatically alter the encoding of the video signals from the video camera based on another condition of at least one of the memory, the power supply, and the processing logic.

Additionally, the condition may correspond to a first available capacity in the memory and the other condition corresponds to a second available capacity in the memory.

In still another implementation, method performed by a mobile video terminal device that includes a memory, a power supply, and processing logic is provided. The method may include encoding, at a first resolution, video signals from a video camera; monitoring a condition of the memory, the power supply or the processing logic; and automatically switching from encoding the video signals at the first resolution to encoding the video signal at a second resolution based on the monitoring of the condition, where the second condition is different from the first condition.

Additionally, the mobile video terminal may further include, prior to automatically switching, indicating to a user that encoding of the video signals from the video camera will be automatically switched.

Additionally, the condition may correspond to available capacity in the memory.

Additionally, the condition may correspond to available capacity of the power supply.

Additionally, the condition may correspond to available capacity of the processing logic.

In a further implementation, a device is provided that may include means for encoding video signals from a video camera at a first resolution; means for monitoring a condition of a memory, a power supply or a processing logic; and means for switching from encoding the video signals at the first resolution to encoding the video signals at a second resolution based on the monitoring of the condition, where the first resolution is a higher resolution than the second resolution.

In another implementation, a method performed by a mobile video terminal may include storing a data set corresponding to a first criteria for a condition of a memory, a power supply or a processing logic; encoding, at a first quality level, video signals from a video camera; monitoring the memory, the power supply or the processing logic to determine if the first criteria has been met; and automatically switching from encoding the video signals at the first quality level to encoding the video signals at a second quality level based on a determination that the first criteria has been met, where the second quality level is different than the first quality level.

Additionally, the method may further include indicating on a display to a user that the first criteria have been met.

Additionally, the data set further may further include data corresponding to a second criteria for another condition of the memory, the power supply or the processing logic, and where the method further includes automatically switching from encoding the video signals at the second quality level to encoding the video signals at a third quality level based on a determination that the second criteria for another condition of the memory has been met, where the third quality level is different than the second quality level.

Additionally, the first criteria and the second criteria may correspond to an available capacity in the memory.

Additionally, the first criteria may correspond to an available capacity of the memory and the second criteria may correspond to an available capacity in the power supply.

Additionally, the resolution for the first quality level may be one of 1080 or 720 lines of vertical resolution.

BRIEF DESCRIPTION OF THE DRAWINGS

Reference is made to the attached drawings, where elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1B:
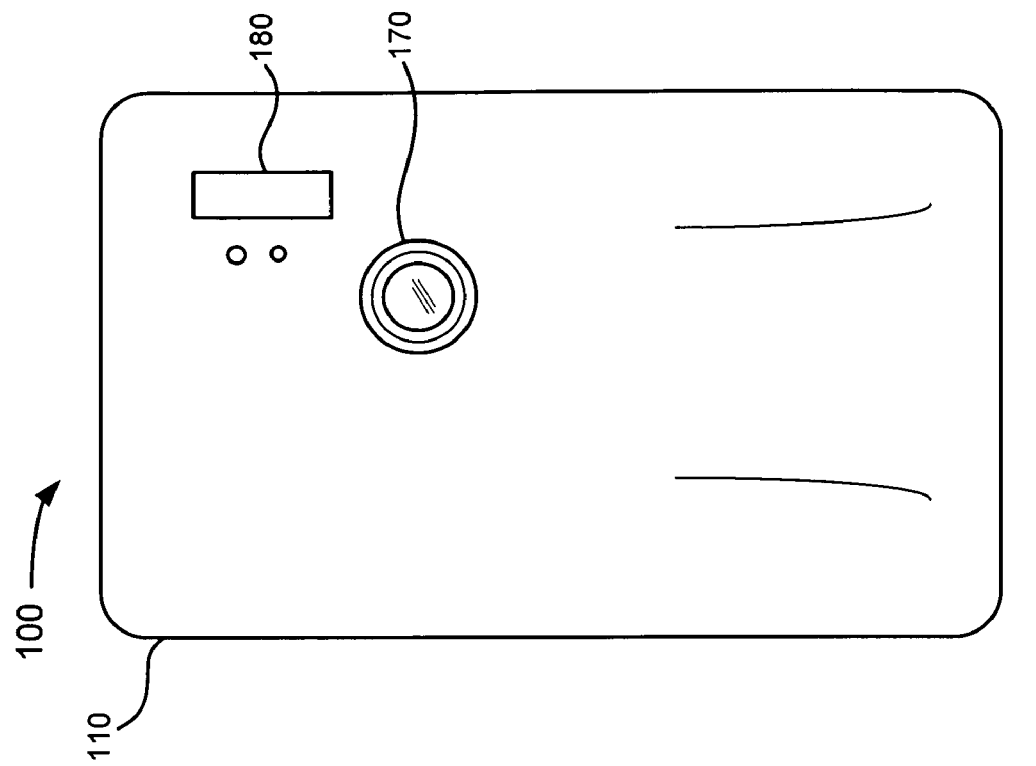
FIG. 1B is a diagram of the back surface of an exemplary mobile video terminal in which methods and systems described herein may be implemented.
Figure 1A:
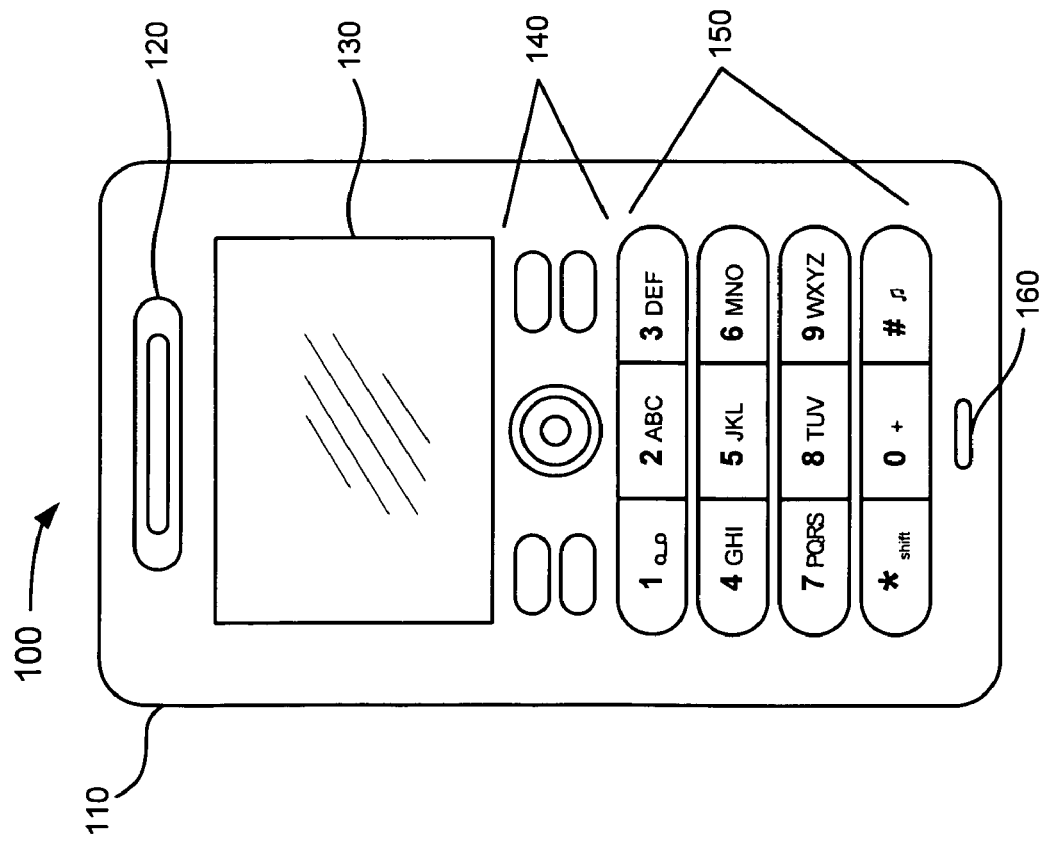
FIG. 1A is a diagram of the front surface of an exemplary mobile video terminal in which methods and systems described herein may be implemented.

FIG. 1A is a diagram of the front side of an exemplary mobile video terminal 100 in which methods and systems described herein may be implemented. FIG. 1B is a diagram of the back side of the exemplary mobile video terminal 100 of FIG. 1A. Implementations are described herein in the context of a mobile video terminal. As used herein, the term "mobile video terminal" may include a cellular radiotelephone with video receiving or recording capability; a Personal Communications System (PCS) terminal that may combine a cellular radiotelephone with data processing, video and data communications capabilities; a personal digital assistant (PDA) that can include a radiotelephone, pager, Internet/Intranet access, Web browser, organizer, calendar and/or a video recorder; and a laptop and/or palmtop receiver or other appliance that includes video encoding and/or decoding capabilities. Mobile video terminal 100 may also include media playing, recording, and storing capabilities. It should also be understood that systems and methods described herein may also be implemented in other devices, with or without including various other communication functionality. For example, mobile video terminal 100 may include a video or still image camera, a camcorder, a personal computer (PC), etc. Furthermore, the mobile video terminals described herein are not limited to any particular known form of existing mobile video terminal.

Referring together to FIGS. 1A and 1B, mobile video terminal 100 may include a housing 110, a speaker 120, a display 130, control buttons 140, a keypad 150, a microphone 160, a camera 170, and a flash 180. Housing 110 may protect the components of mobile video terminal 100 from outside elements. Speaker 120 may provide audible information to a user of mobile video terminal 100.

Display 130 may provide visual information to the user. For example, display 130 may provide information regarding incoming or outgoing telephone calls and/or incoming or outgoing electronic mail (e-mail), instant messages, short message service (SMS) messages, etc. Display 130 may also display video or still images associated with camera 170. For example, display 130 may display images currently focused on by a lens or view finder of camera 170. Display 130 may also be used to display stored pictures or videos taken by camera 170 and/or received by mobile video terminal 100. Display 130 may also display messages to the user relating to applications on mobile video terminal 100, various alerts, the current time, video games being played by a user, downloaded content (e.g., news, images, or other information), etc.

Control buttons 140 may permit the user to interact with mobile video terminal 100 to cause mobile video terminal 100 to perform one or more operations, such as place a telephone call, play various media, etc. For example, control buttons 140 may include a dial button, hang up button, play button, etc. Control buttons 140 may also include one or more control buttons for activating and/or controlling camera 170 and/or controlling an accessory associated with camera 170, such as flash 180, a lens cover, shutter button, etc. In an exemplary implementation, control buttons 140 may also include one or more buttons that control settings associated with applications showing on display 130. For example, one of control buttons 140 may be used to alter settings for camera 170 while the camera is supplying video images. Further, one of control buttons 140 may be a menu button that permits the user to view options associated with executing various application programs, including, for example, video camera applications, stored in mobile video terminal 100.

Keypad 150 may include a standard telephone keypad used to enter numbers and/or text. Keypad 150 may also provide dual input functions for controlling other applications, such as those associated with camera 170. Other types of input devices may also be provided. For example, in other implementations, a touch screen may be provided to enter information. In still other implementations, a speech-to-text engine or other devices may be used to input information to mobile video terminal 100. Still other implementations may include additional input buttons on an edge of housing 110. Microphone 160 may receive audible information from the user and from other parties in the vicinity of mobile video terminal 100.

Camera 170 may be a video camera and may include camera elements that enable mobile video terminal 100 to take still pictures and/or videos. Camera 170 may store the pictures/videos in a memory within mobile video terminal 100 and/or other possibly remote locations. Camera 170 may also communicate with processing logic within mobile video terminal 100 to control various aspects with respect to taking and storing pictures/videos, as described in detail below. Camera 170 may work in conjunction with flash 180 and other camera accessories, such as light sensors and light sources included in, or operating in conjunction with, mobile video terminal 100.

Figure 2:
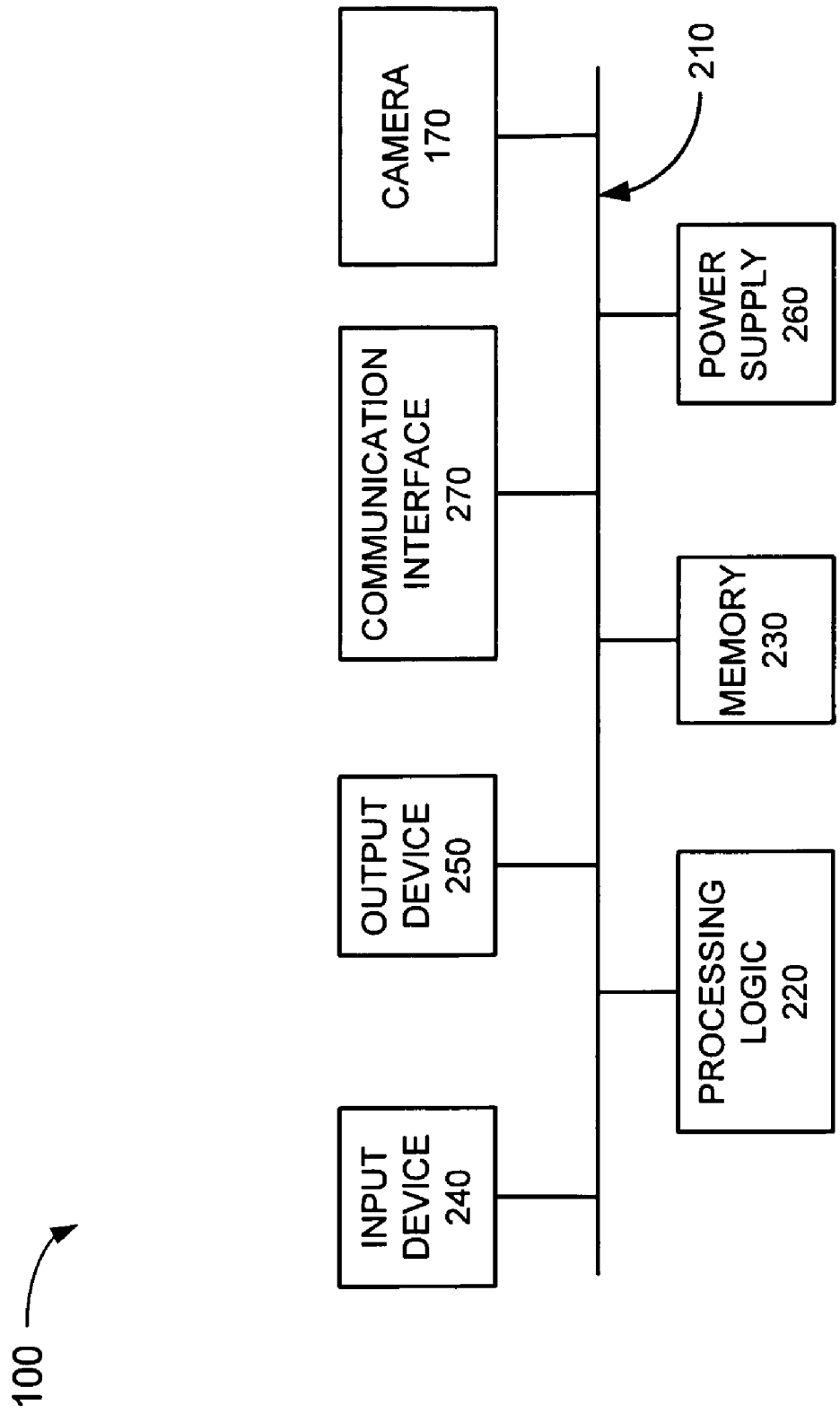
FIG. 2 is a diagram illustrating components of the mobile video terminal of FIGS. 1A and 1B according to an exemplary implementation.

FIG. 2 is a diagram illustrating components of mobile video terminal 100 according to an exemplary implementation. Mobile video terminal 100 may include bus 210, processing logic 220, memory 230, input device 240, output device 250, power supply 260, communication interface 270, and camera 170. In other implementations, mobile video terminal 100 may be configured in a number of other ways and may include other or different components. For example, mobile video terminal 100 may include one or more modulators, demodulators, encoders, decoders, etc., for processing data.

Bus 210 may permit communication among the components of mobile video terminal 100. Processing logic 220 may include a processor, microprocessor, an application specific integrated circuit (ASIC), a field programmable gate array (FPGA) or the like. Processing logic 220 may execute software instructions/programs or data structures to control operation of mobile video terminal 100 and/or components within mobile video terminal 100. In one implementation, processing logic 220 may include a codec to encode digital video signals. Processing logic 220 may also include a video codec that enables video compression and/or decompression for digital video.

Memory 230 may include a random access memory (RAM) or another type of dynamic storage device that stores information and instructions for execution by processing logic 220; a read only memory (ROM) or another type of static storage device that stores static information and instructions for use by processing logic 220; a flash memory (e.g., an electrically erasable programmable read only memory (EEPROM)) device for storing data and/or instructions; and/or some other type of magnetic or optical recording medium and its corresponding drive. Memory 230 may also be used to store temporary variables or other intermediate information during execution of instructions by processing logic 220. Instructions used by processing logic 220 may also, or alternatively, be stored in another type of computer-readable medium accessible by processing logic 220. A computer-readable medium may include one or more logical or physical memory devices.

Input device 240 may a include mechanism that permits a user to input information to mobile video terminal 100, such as microphone 160, keypad 150, control buttons 140, a keyboard, a gesture-based device, an optical character recognition (OCR) based device, a joystick, a virtual keyboard, a speech-to-text engine, a mouse, a pen, voice recognition and/or biometric mechanisms, etc.

Output device 250 may include a mechanism that outputs information to the user, including a display, such as display 130, a printer, one or more speakers, such as speaker 120, etc. Power supply 260 may include one or more batteries (rechargeable or disposable) or another type of power source used to supply power to components of mobile video terminal 100.

Communication interface 270 may include any transceiver-like mechanism that enables mobile video terminal 100 to communicate with other devices and/or systems. For example, communication interface 270 may include a modem or an Ethernet interface to a LAN. Communication interface 270 may also include mechanisms for communicating via a network, such as a wireless network. For example, communication interface 270 may include one or more radio frequency (RF) transmitters, receivers and/or transceivers and one or more antennas for transmitting and receiving RF data via a network.

Camera 170 may be a camera with the capability to make video signals suitable for encoding and decoding video images for a variety of resolutions and/or compressions. Resolution capabilities may range, for example, from high definition (e.g 1080p and 720p) to lower resolutions such as VGA and below.

Mobile video terminal 100 may provide a platform for a user to take and receive pictures/videos; place and receive telephone calls; send and receive electronic mail, text messages, multi-media messages, and short message service (SMS) messages; and execute various other applications. Mobile video terminal 100 may perform these operations in response to processing logic 220 executing sequences of instructions contained in a computer-readable medium, such as memory 230. Such instructions may be read into memory 230 from another computer-readable medium via, for example, communication interface 270. In alternative embodiments, hard-wired circuitry may be used in place of or in combination with software instructions to implement processes described herein. Thus, implementations described herein are not limited to any specific combination of hardware circuitry and software.

Figure 3:
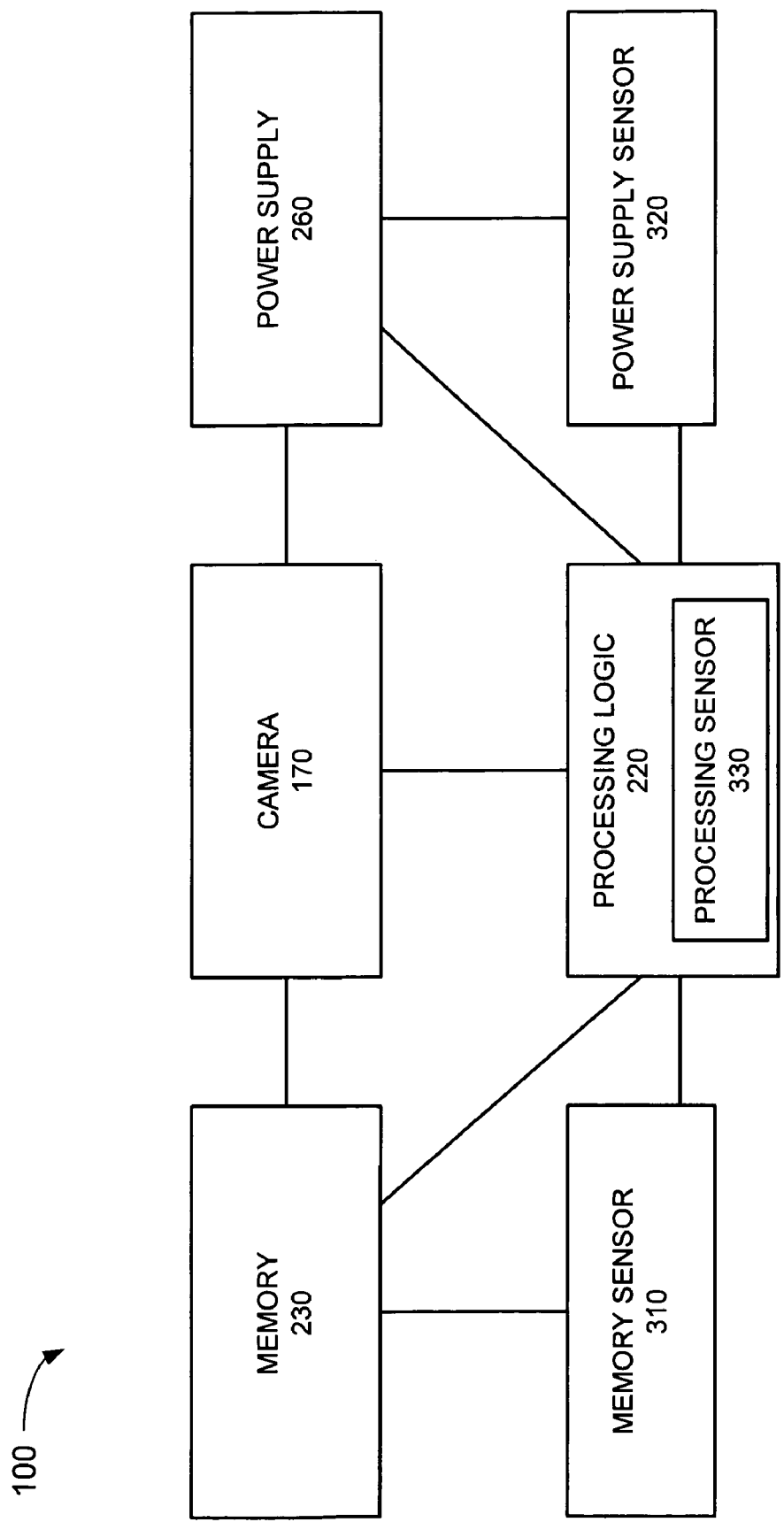
FIG. 3 illustrate exemplary components in the mobile video terminal of FIG. 2 according to an exemplary implementation.

FIG. 3 is an exemplary functional block diagram of components implemented in mobile video terminal 100. Referring to FIG. 3, mobile video terminal 100 may include memory 230, a memory sensor 310, camera 170, processing logic 220, power supply 260 and a power supply sensor 320. Components, although listed separately, may be combined with other components. For example, memory sensor 310 and power supply sensor 320 may be included as part of other components, such as memory 230 and power supply 320, respectively. As another example, camera 170 may integrate aspects of multiple other components, such as processing logic 220.

Memory 230 may store video signals received from camera 170 and encoded by processing logic 220. Memory 230 may include internal (e.g., fixed) memory and/or external (e.g., removable) memory. At any point in time, memory 230 may generally have a known, fixed capacity. The internal memory may be supplemented with other removable memory components, such as memory cards, to expand the memory capacity. Memory 230 may be used to store a variety of data including, for example, video and photos from camera 170, telephone numbers, MP3 music, and software programs. Memory sensor 310 may monitor the available storage capacity of memory 230 and, in some implementations, the rate at which the storage capacity of memory 230 may be changing.

Power supply 260 may be a battery that may contain a finite amount of stored energy. Power supply 260 may be a rechargeable battery, such as a lithium ion battery, or a disposable battery. Power supply 260 may capable of being supplemented with other removable power components, such as external batteries, to expand the power capacity. In other implementations, power supply 260 may be capable of being supplemented with an effectively non-finite power source, such as an electrical adaptor or another device that can receive power from another source. Power supply 260 may provide power to some or all of the components of mobile video terminal 100, including processing logic 220, memory 230 and camera 170. Power supply sensor 320 may monitor the amount of stored energy available in power supply 260, and, in some implementations, the rate at which the amount of stored energy in power supply 260 is changing.

Camera 170 may supply video signals and/or other digital image signals to be processed at a variety of compression ratios and resolutions. Data recorded from camera 170 may be stored in memory 230.

Processing logic 220 may execute software instructions/programs or data structures to control operation of various components of mobile video terminal 100, including memory 230, memory sensor 310, camera 170, power supply 260, and power supply sensor 220. Processing logic 220 may include an encoder, which converts video signals from analog to digital. Processing logic 220 may also include a decoder, which converts digital signals back to analog for viewing. More specifically, processing logic 220 may include a video processing system to selectively alter video resolution and/or compression. When processing logic 220 records at different resolutions, the requirements for each of memory usage, power usage, and processing power may change. For example, encoding and decoding of higher resolution video are generally more memory-intensive, power-intensive, and processor-intensive than encoding and decoding of lower resolution video.

Processing logic 220 may also include a processing sensor 330 to monitor processing requests from other components in mobile video terminal 100 and the processing capacity of processing logic 220 to complete the requests. In certain implementations, processing logic 220 may receive information from memory sensor 310, power supply sensor 320, and processing sensor 330 to monitor the capacity of memory 230, power supply 260, and processing logic 220, respectively, to continue to record and process input from camera 170 and output to other components (such as, for example, output device 250). Based on the information from memory sensor 310, power supply sensor 320, and processing sensor 330, processing logic 220 may automatically alter the quality of processed video from camera 170 to allow for continued video functions when approaching capacity limits for other components of mobile video terminal 100.

For example, in one implementation, processing logic 220 may automatically downgrade video quality from a higher available resolution (e.g., 1080p) to a lower resolution (e.g., 720p) based on a signal from memory sensor 310 that memory 230 has reached a certain level (e.g., 80%) of available capacity. In other implementations, processing logic 220 may automatically downgrade video quality, based on signals from power supply sensor 320 or processing sensor 330, as described in detail below. In another implementation, scaling of the video quality may be done in a continuous manner, from, for example, 100% of a selected higher resolution gradually (e.g., linearly) down to 25% of the originally selected resolution. In still another implementation, scaling of video quality may be done using a combination of incremental steps and linear downgrades.

In one implementation, the ability of processing logic to automatically alter the video quality of camera 170 may be pre-selected by the user. By allowing a user to pre-authorize adaptive video encode scaling, mobile video terminal 100 can seamlessly adjust video quality in response to capacity feedback from one or more selected sensors. In another implementation, video settings may be adjusted only upon a confirmation from a user just prior to a change being made. In yet another implementation, a user may be given the option to override an automatic downgrade to video quality during the recording process.

Figure 4:
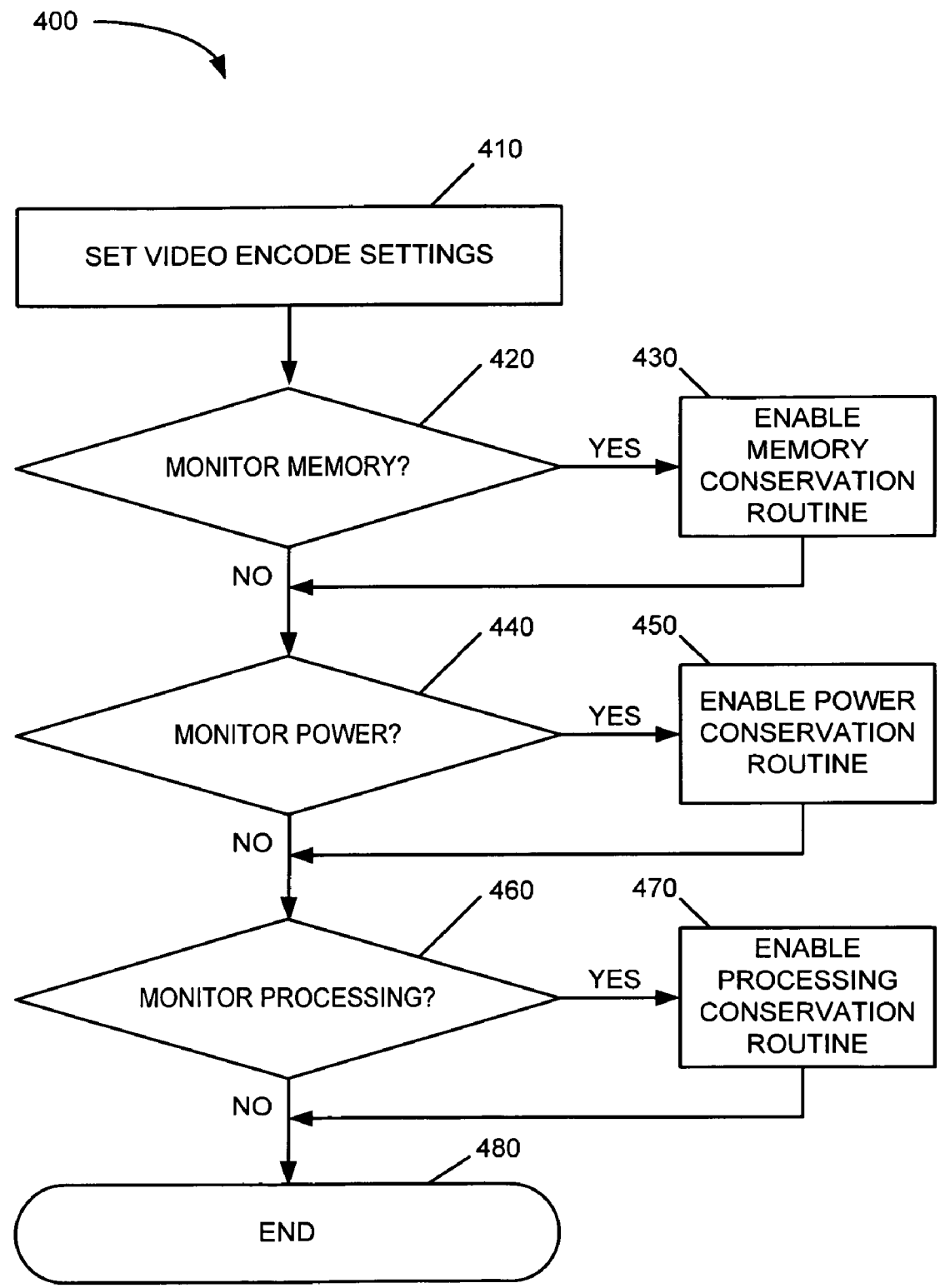
FIG. 4 is a flow diagram illustrating a process of defining pre-programmed settings according to an exemplary implementation.

FIG. 4 provides a flow diagram of a pre-selection scheme 400 to enable adaptive video encode scaling. In block 410, video encode settings may be set. For example a user may identify settings for the video recording (in contrast with the variety of settings for other features and components for mobile video terminal 100).

In block 420, a user may be asked whether to enable adaptive video encode scaling based on memory monitoring. If the user selects 'yes,' processing logic 220 may enable a memory conservation routine (block 430). The memory conservation routine is discussed in more detail with respect to FIG. 5. The memory conservation routine may be accomplished exclusively or in parallel with other routines, such as a power conservation routine and/or a processing conservation routine described below. Thus, regardless of whether the memory conservation routine is selected, the query proceeds to request whether to enable adaptive video encode scaling based on other sensor information.

In block 440, the user may be asked whether to enable adaptive video encode scaling based on power monitoring. If a user selects 'yes,' processing logic 220 may enable a power conservation routine (block 450). The power conservation routine is discussed in more detail with respect to FIG. 6. The power conservation routine may be accomplished exclusively or in parallel with other routines, such as the memory conservation routine above and/or the processing conservation routine. Thus, regardless of whether the power conservation routine is selected, the query proceeds to request whether to enable adaptive video encode scaling based on other sensor information.

In block 460, a user may be asked whether enable adaptive video encode scaling based on processing monitoring. If the user selects 'yes,' processing logic 220 may enable a processing conservation routine (block 470). The processing conservation routine is discussed in more detail with respect to FIG. 7. The processing conservation routine may be accomplished exclusively or in parallel with other routines, such as the memory conservation routine and/or the power conservation routine mentioned above. After inquiry for each of the conservation routines has been accomplished, the pre-selection scheme 400 is complete (block 480).

Figure 5:
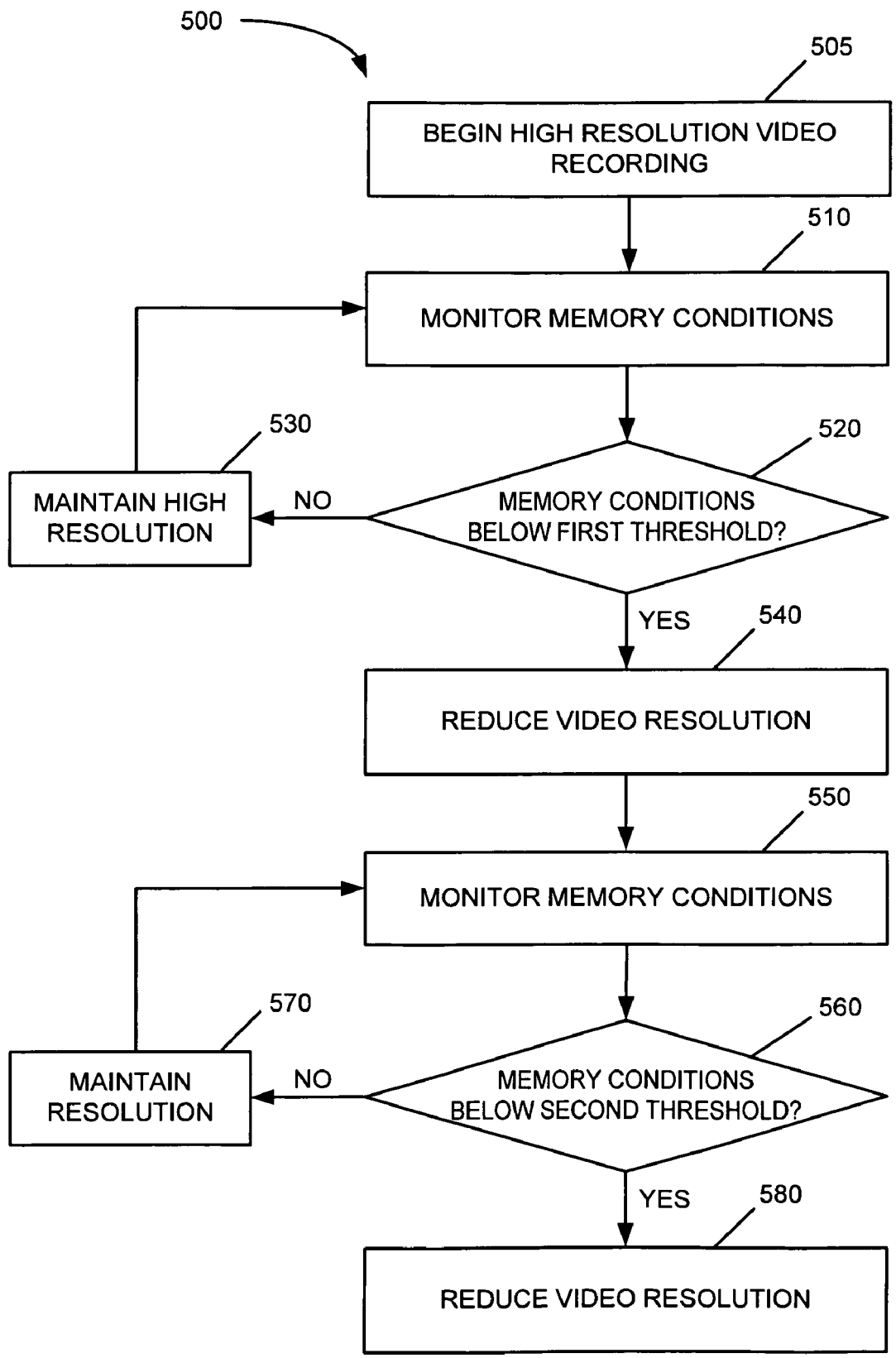
FIG. 5 is a flow diagram illustrating an exemplary process performed by a mobile video terminal.

FIG. 5 is a flow diagram 500 illustrating exemplary processing by mobile video terminal 100 to use adaptive video encode scaling based on memory monitoring. In block 505, the user (after choosing to enable at least a memory conservation routine for the mobile video terminal 100) may begin video recording in a high available quality (e.g., 1080p resolution) that is supported by, for example, camera 170 and processing logic 220. In block 510, mobile video terminal 100 may monitor the memory conditions generally, and particularly the amount of memory available for storing video recording data. The memory to be monitored may be memory 230, and the monitoring may be accomplished by memory sensor 310, in conjunction with processing logic 220, each of which is described above with respect to FIG. 3.

In block 520, mobile video terminal 100 may compares current memory conditions to a predetermined first memory threshold. In one implementation, capacity thresholds for memory (and power and processing thresholds) may be stored as a data set that may be altered by the user. The first memory threshold may be expressed as a percentage of the available memory capacity (e.g., 25% of the total memory capacity), or it may be a fixed amount of available memory (e.g., 50 MB). As the available memory is consumed by the encoded video data, the available memory capacity is compared against the first memory threshold. As long as the remaining memory capacity is above the first memory threshold the mobile video terminal may continue to record using the originally-selected quality (block 530). However, if the remaining memory capacity drops below the first memory threshold, mobile video terminal 100 (using, for example, processing logic 220) may automatically reduce the video recording quality to a first less-memory-intensive resolution (block 540). For example, if the first memory threshold is at 25 MB, and the available memory capacity drops below 25 MB, the video resolution may be reduced from the originally-selected resolution (e.g., 1080p) to an incrementally-lower resolution (e.g., 720p). Additionally, and/or alternatively, the mobile video terminal 100 may automatically switch to a less-memory-intensive video compression. A user may be notified of the pending change in video quality by, for example, an indication on display 130 and given the opportunity to override the automatic change.

In block 550, mobile video terminal 100 may continue to monitor the memory conditions. In block 560, mobile video terminal 100 may compare current memory conditions to a particular second memory threshold. As with the first memory threshold, the second memory threshold may be expressed as a percentage of the total memory capacity (e.g., 10% of the total memory capacity), or it may be a fixed amount of available memory (e.g., 10 MB). As the available memory is consumed by the recorded video data, the remaining memory capacity is compared against the second memory threshold. As long as the remaining memory capacity is below the first memory threshold and above the second memory threshold, the mobile video terminal may continue to record using the first lower resolution (block 570). However, if the remaining memory capacity drops below the second memory threshold, mobile video terminal 100 may automatically reduce the video recording quality to a second less-memory-intensive resolution (block 580). For example, if the second memory threshold is at 10 MB, and the available memory capacity drops below 10 MB, the video resolution may be reduced from the previous resolution (e.g., 720p) to an incrementally lower resolution (e.g., VGA, which may generally be defined as 640×480 resolution) and/or higher compression for the remainder of the video recording or until the memory is capacity is consumed.

Process 500 is has been described to include reductions in video quality. However, the process may also employ increases in video quality to return the video quality to the originally-selected quality after a reduction. For example, video quality may be restored to the originally-selected quality if the memory capacity is increased by the addition of an external memory card. Also, while two levels of video quality reduction have been described, one or more than two reductions may be used. In another implementation, a linear video quality reduction may be employed when a particular capacity threshold is exceeded.

Figure 6:
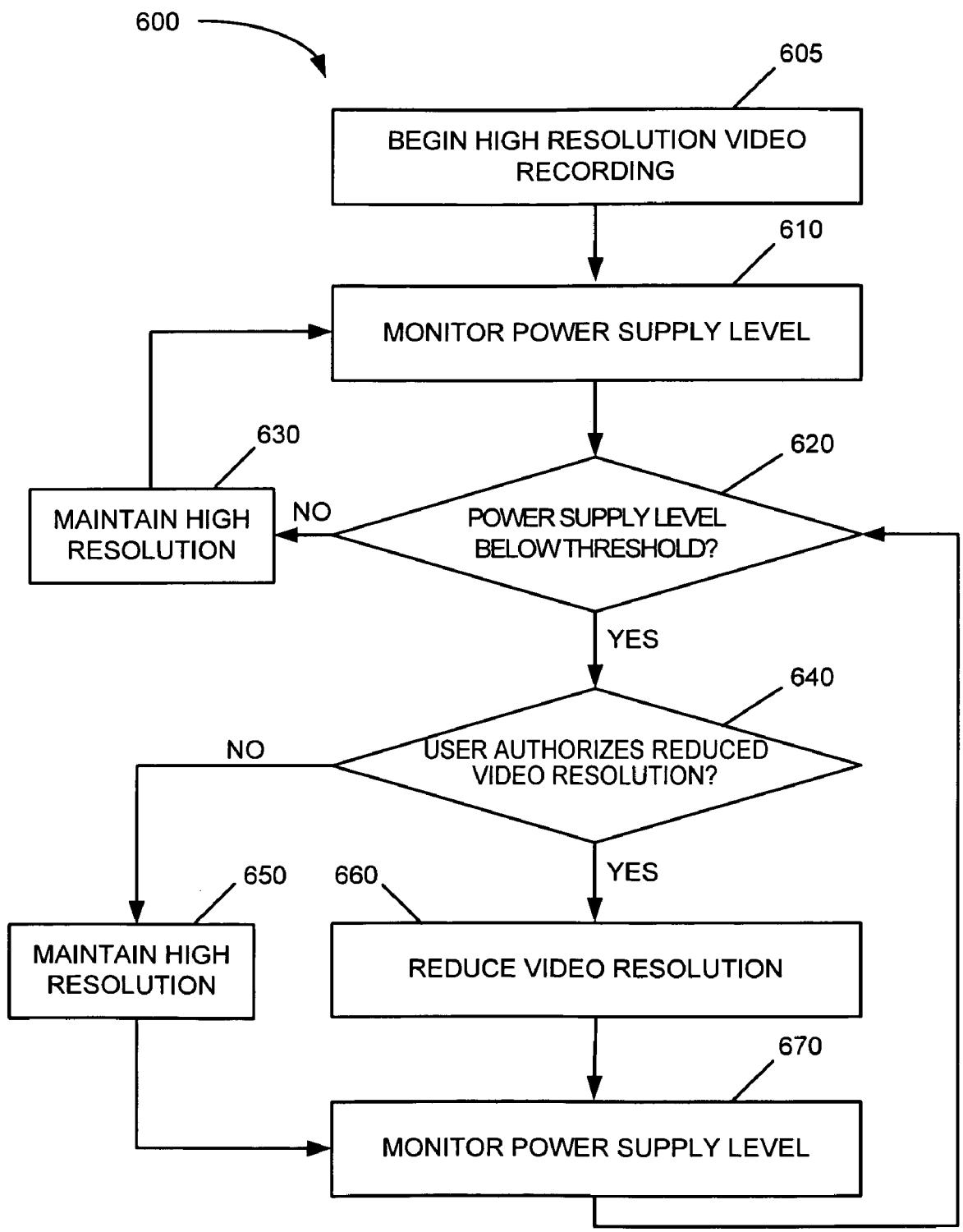
FIG. 6 is a flow diagram illustrating a different exemplary process performed by a mobile video terminal.

While process 500 is described above with respect to adaptive video encode scaling based on memory capacity, the process may be similarly applied to adaptive video encode scaling based on power capacity or processing capacity FIG. 6 is a flow diagram 600 illustrating another exemplary process performed by mobile video terminal 100 to use adaptive video encode scaling based on power monitoring. In block 605, the user (after selecting to enable at least a power conservation routine for the mobile video terminal 100) may begin video recording in a high available video quality that is supported by, for example, camera 170 and processing logic 220.

In block 610, mobile video terminal 100 may monitor the power level generally, and particularly the amount of power available for processing video recording data. The power level to be monitored may be power supply 260, and the monitoring may be accomplished by power supply sensor 320, in conjunction with processing logic 220, each of which is described above with respect to FIG. 3.

In block 620, mobile video terminal 100 may compare a current power level to a particular power supply level threshold. The power supply level threshold may be expressed, for example, as a percentage of the available power (e.g., 30% of the total battery capacity), or it may be a time interval of remaining battery power (e.g., 15 minutes at the processing rate for the selected video quality).

As the available power is consumed by the recorded video data, the available amount of power is compared against the power supply level threshold. As long as the remaining amount of power is above the power supply level threshold, the mobile video terminal may continue to record using the originally selected resolution (block 630).

If the remaining amount of power drops below the power supply level threshold, mobile video terminal 100 (using, for example, processing logic 220) may indicate to the user that the power supply is getting low and request permission from the user to automatically reduce the video recording quality to a less-power-intensive resolution (block 640). For example, if the power supply threshold is 30% of the total battery capacity, and the available power supply capacity drops below 30%, an indicator may appear on a display (such as display 130) to request confirmation to automatically reduce video resolution. For example, it may request to automatically reduce the video resolution from the originally-selected resolution (e.g., 1080p) to an incrementally-lower resolution (e.g., 720p). The user may deny the request. For example, the user may be aware that the event being recorded is about to end, or that a supplementary power source is readily available. If the user does not authorize a switch to the reduced video resolution, mobile video terminal 100 may continue to record using the originally selected resolution (block 650). In another exemplary implementation, the processing logic may be set to automatically alter the video quality of camera 170 and the user may be given the option to override an automatic downgrade to video quality during the recording process. In another implementation, mobile video terminal 100 may seamlessly adjust video quality in response to capacity feedback, and the user would be required to restore the originally-selected video quality if desired.

If the user, in response to the request permission from the user to automatically reduce the video recording quality, authorizes the switch to reduced video quality, mobile video terminal 100 may reduce the video recording quality to the less-processing-intensive resolution and/or video compression (block 660). In block 670, the mobile video terminal 100 continues to monitor the power supply conditions. The process flow may be repeated beginning at block 620 for additional thresholds.

Process 600 is has been described to include reductions in video quality. However, the process may also employ increases in video quality to return the video quality to the originally-selected quality after a reduction. For example, video quality may be restored to the originally-selected quality if the power capacity is increased by the addition of an external power cord adaptor.

Figure 7:
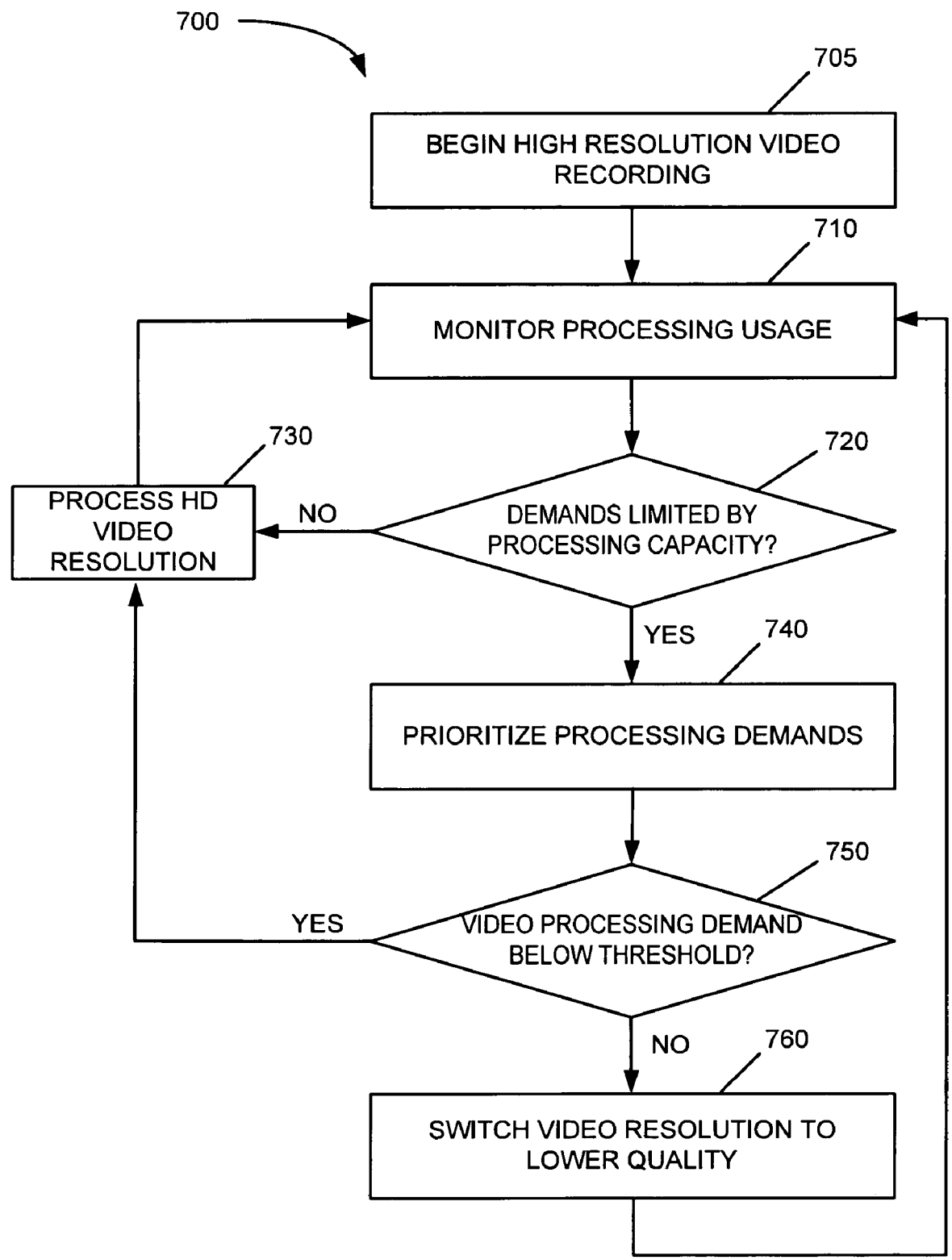
FIG. 7 is a flow diagram illustrating another exemplary process performed by a mobile video terminal.

FIG. 7 is a flow diagram 700 illustrating an exemplary process performed by mobile video terminal 100 to use adaptive video encode scaling based on processing capacity. In block 705, the user (after selecting to enable at least a processing conservation routine for the mobile video terminal 100) may begin video recording in a high available resolution that is supported by, for example, camera 170 and processing logic 220. In block 710, mobile video terminal 100 may monitor the processing level generally, and particularly the amount of processing power available for processing video recording data. The processing to be monitored may be processing logic 220, and the monitoring may be accomplished by processing sensor 330, each of which is described above with respect to FIG. 3.

In block 720, mobile video terminal 100 may evaluate the current processing demands (for both video recording and other applications) to determine if the current demands exceed processing capacity for simultaneous processing. For example, during a video recording process, mobile video terminal 100 may also be receiving voice, text, or image data from a wireless network connection. If the processing capacity is sufficient to allow simultaneous processing of the current demands, then the mobile video terminal 100 may continue to record using the originally-selected resolution (block 730).

If the processing capacity is not sufficient to allow simultaneous processing of the current demands, then processing logic 220 may prioritize each of the processing demands (block 740). If the priority ranking for the originally-selected video quality (e.g., 1080p) is high, then the mobile video terminal 100 may continue to record using the originally-selected resolution (block 730). However, if the priority ranking for the originally-selected video quality is not high enough, processing logic 220 may identify a less processing-intensive resolution and/or compression (e.g., lower-quality video) that can be accommodated under the current prioritization (block 760). For example, if 50% of the available processing capacity is designated for applications with a higher priority than video recording, processing logic 220 may step down multiple video resolution levels (e.g., from 1080p to 576p or even 480p) to accommodate the other processing priorities.

After switching to a lower resolution in block 760, processing logic 220 may continue to monitor processing usage (block 710) and return to the originally-selected video resolution if the processing capacity again becomes sufficient to allow simultaneous processing of the current demands or if the priority rank of the high-resolution video recording increases.

While process 700 is described above with respect to adaptive video encode scaling based on processing priority, the process may be similarly applied to adaptive video encode scaling based on power capacity and/or memory capacity.

Figure 8:
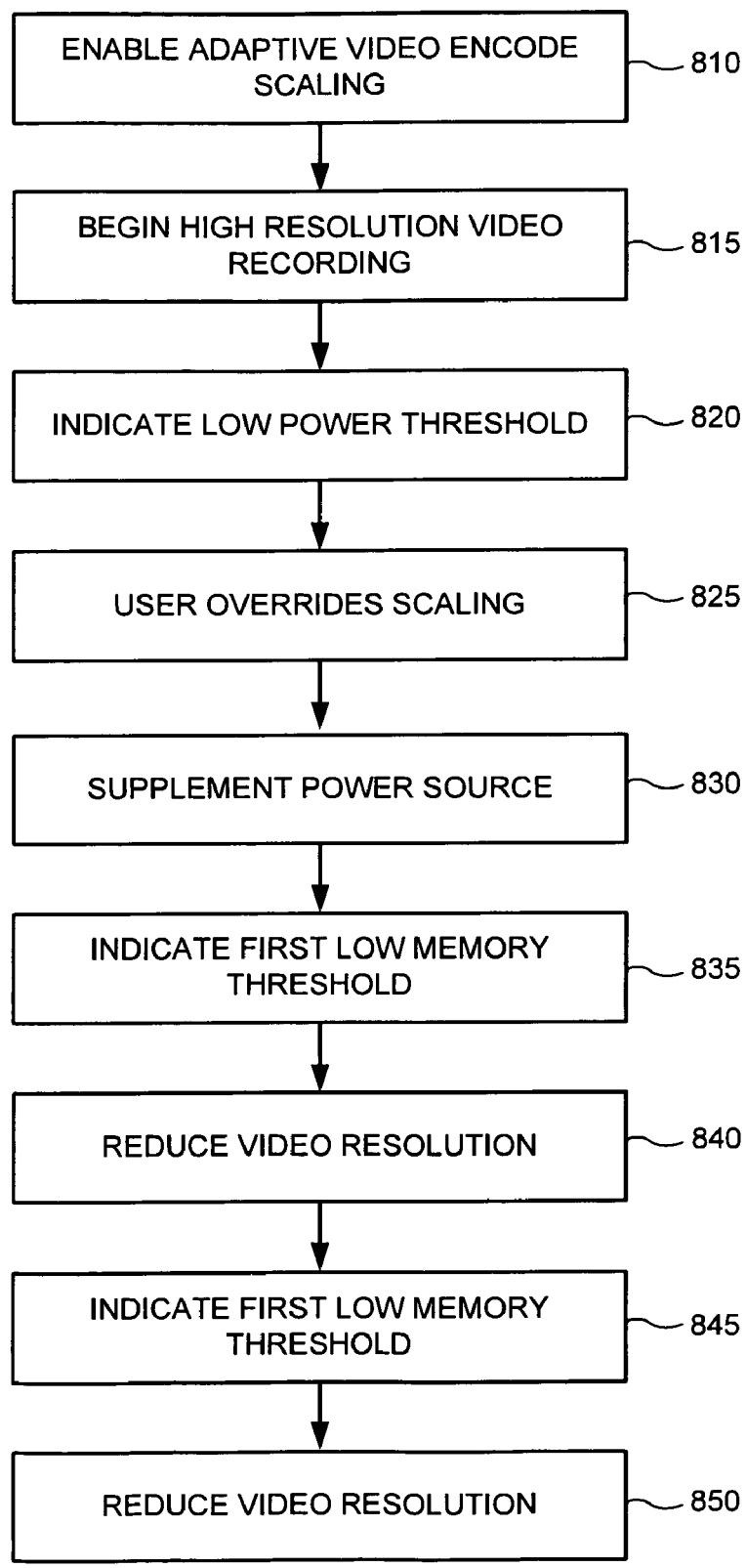
FIG. 8 is a flow diagram of an exemplary process for using adaptive video encode scaling in a mobile video terminal.

The following example may be used to further illustrate implementations described herein. Referring to FIG. 8, a user may use a mobile video terminal, such as mobile video terminal 100 of FIGS. 1A and B, to record an event, which in this particular example may be a child's band performance. In block 810, the user may enable adaptive video encode scaling on the mobile video terminal for memory conservation, power conservation, and processing conservation (as described, for example, in relation to FIG. 4). In block 815, the user then begins recording the band performance using the highest available digital video resolution for the mobile video terminal (e.g., 1080p). However, after only a few minutes, the battery for the mobile video terminal begins to run low because the user had not recently charged the battery. When the remaining battery capacity reaches 30%, the mobile video terminal may show on the display an indication to the user that the video resolution will be reduced, for example, in 10 seconds and prepares to automatically reduce the video quality (block 820). However, the user has a power cord adaptor and, seeing an electrical outlet nearby, decides to override the automatic resolution decrease (block 825). In between songs by the band, the user is able to connect the power cord adaptor so that battery life no longer becomes a factor for the remainder of the band performance (block 830).

After several songs by the band, the memory in the mobile video terminal reaches the first conservation threshold (e.g., 25 MB remaining). The mobile video terminal displays an indication to the user that video resolution will be reduced in 10 seconds and prepares to automatically reduce the video quality (block 835). With no foreseeable end to the band's performance, the user (in block 840) passively allows the video resolution to be reduced from the highest video resolution to a lower resolution (i.e., 720p). The band performance continues, and eventually the final song is announced. During the song, the memory in the mobile video terminal reaches the second conservation threshold (e.g., 10 MB remaining). The mobile video terminal displays an indication to the user that video resolution will again be reduced (for example, from 720p to 576p) in 10 seconds and prepares to automatically reduce the video quality (block 845). Anticipating an encore, the user (in block 845) passively allows the video resolution to be reduced and is able to record the remainder of the performance.

CONCLUSION

Implementations described herein may address the issue that a mobile video terminal may quickly run out of local memory space, power, or processing capacity when shooting high quality video. In certain implementations, the memory, power and/or processing level of a mobile video terminal is monitored so that the mobile video terminal may automatically switch to a lower resolution when one of the monitored features approaches a limiting point.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, implementations have been mainly described in the context of a mobile video terminal. These implementations, however, may be used with any type of device that includes video encoding capabilities.

As another example, implementations have been mainly described in the context of a step down (or up) in video quality, such as a change in video resolution from 1080p to 720p. However, these implementations may also be practiced using a linear regression (or progression) in video quality with respect to a sliding-scale capacity threshold.

Also, implementations have been mainly described in the context of using varied resolution or compression to scale video quality to available capacity. However, these implementations may be practiced with other digital video processing systems that adaptively scale video quality.

While implementations have be primarily described in the context of receiving video signals from a video camera, implementations may also be practiced using video signals from other sources. For example, video signals may be received from a source external to the mobile video terminal (through a network via a communications interface, for example). Video signals received from external sources may be adaptively encoded/decoded and compressed/decompressed by according to some implementations.

Further, while series of blocks have been described with respect to FIGS. 4 through 8, the order of the blocks may be varied in other implementations consistent with the invention. Moreover, non-dependent blocks may be performed in parallel.

It will also be apparent that aspects described herein may be implemented in methods and/or computer program products. Accordingly, aspects may be embodied in hardware and/or in software (including firmware, resident software, micro-code, etc.). Furthermore, aspects described herein may take the form of a computer program product on a computer-usable or computer-readable storage medium having computer-usable or computer-readable program code embodied in the medium for use by or in connection with an instruction execution system. The actual software code or specialized control hardware used to implement these aspects is not limiting. Thus, the operation and behavior of the aspects were described without reference to the specific software code—it being understood that software and control hardware could be designed to implement the aspects based on the description herein.

Further, certain aspects described herein may be implemented as "logic" that performs one or more functions. This logic may include hardware, such as a processor, microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A mobile video terminal, comprising:
   a video camera to supply video signals;
   a processor to selectively encode the video signals from the video camera at different resolutions;
   processing sensing logic to monitor the processor and generate information regarding available processing demands on the processor;
   a memory to store the video signals encoded by the processor;
   memory sensing logic to monitor the memory and generate information regarding an available capacity of the memory;
   a power supply of finite capacity to supply power for the processor; and
   power supply sensing logic to monitor the power supply and generate information regarding an available capacity of the power supply;
   where the processor is configured to automatically alter the resolution of the video signals based on:
   the information regarding the available capacity of the memory from the memory sensing logic,
   the information regarding the available processing demands on the processor from the processing sensing logic, and
   the information regarding the available capacity of the power supply from the power supply sensing logic.

2. The mobile video terminal of claim 1, where the processor selectively compresses the video signals at different compressions and automatically alters the compression of the video signals based on the information regarding the available capacity of the memory from the memory sensing logic, the information regarding the available processing demands on the processor from the processing sensing logic, and the information regarding the available capacity of the power supply from the power supply sensing logic.

3. The mobile video terminal of claim 1, further comprising:
   a display to provide indications to a user, where the display indicates to the user that the resolution of the video signals will be automatically altered prior to automatically altering the resolution of the video signals.

4. The mobile video terminal of claim 3, further comprising:
   an input device to permit the user to override the automatic altering of the resolution of the video signals by the processing logic.

5. A mobile video terminal, comprising:
   a video camera to supply video signals;
   a processor to selectively encode the video signals from the video camera at different quality levels;
   a memory to store the video signals encoded by the processor; and
   a power supply to supply power for the mobile video terminal,
   where the processor is further configured to monitor a condition of the memory, a condition of the power supply, and a condition of the processor, and where the processor automatically alters the encoding of the video signals from the video camera based on at least one of the condition of the memory, the condition of the power supply, and the condition of the processor.

6. The mobile video terminal of claim 5, where the condition of the memory corresponds to an available capacity in the memory.

7. The mobile video terminal of claim 5, where the condition of the processor corresponds to an available capacity of the processor.

8. The mobile video terminal of claim 5, where the condition of the power supply corresponds to an available capacity of the power supply.

9. A method performed by a mobile video terminal device that includes a memory, a power supply, and processing logic, comprising:
   encoding, at a first resolution, video signals from a video camera;
   monitoring a condition of the memory, a condition of the power supply, and a condition of the processing logic; and
   automatically switching from encoding the video signals at the first resolution to encoding the video signal at a second resolution based on the monitoring of the condition of the memory, the condition of the power supply, and the condition of the processing logic, where the second resolution is different from the first resolution.

10. The method of claim 9, further comprising:
prior to said automatically switching, indicating to a user that encoding of the video signals from the video camera will be automatically switched.

11. The method of claim 9, where the condition of the memory corresponds to an available capacity in the memory.

12. The method of claim 9, where the condition of the power supply corresponds to an available capacity of the power supply.

13. The method of claim 9, where the condition of the processing logic corresponds to an available capacity of the processing logic.

14. A mobile device, comprising:
means for encoding video signals from a video camera at a first resolution;
means for monitoring a condition of a memory, a condition of a power supply, and a condition of a processing logic; and
means for switching from encoding the video signals at the first resolution to encoding the video signals at a second resolution based on the monitoring of the condition of the memory, the condition of the power supply, and the condition of the processing logic, where the first resolution is a higher resolution than the second resolution.

15. A method performed by a mobile video terminal, comprising:
storing a data set corresponding to a first criteria for a condition of a memory, a condition of a power supply, and a condition of a processing logic;
encoding, at a first quality level, video signals from a video camera;
monitoring the memory, the power supply, and the processing logic to determine if one of the conditions of the first criteria has been met; and
automatically switching from encoding the video signals at the first quality level to encoding the video signals at a second quality level based on a determination that the one of the conditions of the first criteria has been met, where the second quality level is different than the first quality level.

16. The method of claim 15, further comprising:
indicating on a display to a user that the one of the conditions of the first criteria has been met.

17. The method of claim 15, where the data set further comprises data corresponding to a second criteria for another condition of the memory, another condition of the power supply, and another condition of the processing logic, and where the method further comprises:
automatically switching from encoding the video signals at the second quality level to encoding the video signals at a third quality level based on a determination that at least one condition of the second criteria has been met, where the third quality level is different than the second quality level.

18. The method of claim 15, where the resolution for the first quality level is one of 1080 or 720 lines of vertical resolution.

* * * * *